US012591162B2

(12) United States Patent (10) Patent No.: US 12,591,162 B2
Bjornard et al. (45) Date of Patent: Mar. 31, 2026

(54) CONTROLLABLE APERTURE WITH INDEX-MATCHED CENTRAL REGION FOR A PORTABLE ELECTRONIC DEVICE IMAGING SYSTEM

(71) Applicant: Apple Inc., Cupertino, CA (US)

(72) Inventors: Erik J. Bjornard, San Jose, CA (US); Tingjun Xu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 455 days.

(21) Appl. No.: 17/903,861

(22) Filed: Sep. 6, 2022

(65) Prior Publication Data

US 2023/0091326 A1     Mar. 23, 2023

Related U.S. Application Data

(60) Provisional application No. 63/246,153, filed on Sep. 20, 2021.

(51) Int. Cl.
| | |
|---|---|
| *G02F 1/153* | (2006.01) |
| *G02F 1/03* | (2006.01) |
| *G02F 1/1335* | (2006.01) |
| *G02F 1/15* | (2019.01) |
| *G02F 1/155* | (2006.01) |
| *G03B 9/02* | (2021.01) |
| *G09G 3/19* | (2006.01) |
| *G09G 3/38* | (2006.01) |
| *H04N 9/16* | (2006.01) |

(52) U.S. Cl.
CPC ........ *G02F 1/155* (2013.01); *G02F 1/133502* (2013.01); *G03B 9/02* (2013.01); *G02F 2202/28* (2013.01)

(58) Field of Classification Search
CPC ...... G02F 1/1523; G02F 1/1533; G02F 1/155; G02F 1/0102; G02F 1/163; G02F 1/0136; G09G 3/16
USPC ........ 359/281, 265–275, 277, 245–247, 242; 345/49, 105; 250/70; 348/814, 817; 438/929; 349/182–186
See application file for complete search history.

(56) References Cited

U.S. PATENT DOCUMENTS

| | | | |
|---|---|---|---|
| 4,200,372 A | 4/1980 | Iwama et al. | |
| 6,667,471 B2 | 12/2003 | Bos et al. | |
| 6,963,437 B2 | 11/2005 | Bauer et al. | |
| 8,780,432 B1 | 7/2014 | Nguyen | |
| 9,307,158 B2 * | 4/2016 | Gleason .................... | G01J 1/04 |

(Continued)

FOREIGN PATENT DOCUMENTS

WO      WO 16/048600      3/2016

*Primary Examiner* — Dawayne Pinkney
(74) *Attorney, Agent, or Firm* — Brownstein Hyatt Farber Schreck, LLP

(57) ABSTRACT

An imaging system for a portable electronic device includes a variable aperture between a lens group and an image sensor. The variable aperture is defined by an electrochromic stack that defines a switching region and a central non-switching region. The non-switching region can be etched through the same material or set of materials defining the switching region and is backfilled with a dielectric transparent material having an index of refraction substantially equal to an average index of refraction of the layer(s) of the switching region of the electrochromic stack. This construction substantially reduces visible light absorption of the variable aperture.

20 Claims, 7 Drawing Sheets

(56)          References Cited

U.S. PATENT DOCUMENTS

| | | | |
|---|---|---|---|
| 9,360,730 | B2 | 6/2016 | Shi |
| 9,759,984 | B1 * | 9/2017 | Xu ......................... H04N 23/55 |
| 9,817,213 | B2 | 11/2017 | Mercado |
| 10,359,679 | B2 | 7/2019 | Trajkovska-Broach et al. |
| 10,429,711 | B2 | 10/2019 | Luten et al. |
| 10,585,322 | B2 | 3/2020 | Gil et al. |
| 2006/0110580 | A1 * | 5/2006 | Aylward ........... G02F 1/133305 |
| | | | 428/172 |
| 2010/0261067 | A1 | 10/2010 | Pitts |
| 2013/0186177 | A1 | 7/2013 | Palazzotto et al. |
| 2015/0241751 | A1 * | 8/2015 | Noble ...................... G03B 9/02 |
| | | | 29/428 |
| 2016/0091768 | A1 * | 3/2016 | Gleason ................ G02B 5/005 |
| | | | 359/275 |
| 2016/0142606 | A1 * | 5/2016 | Gleason ................... G03B 9/02 |
| | | | 359/275 |
| 2016/0209722 | A1 | 7/2016 | Wang |
| 2017/0357135 | A1 | 12/2017 | Gillaspie |
| 2018/0252946 | A1 * | 9/2018 | Chandrasekhar ....... G02F 1/155 |
| 2019/0023981 | A1 | 1/2019 | Van Der Boom et al. |
| 2019/0353971 | A1 | 11/2019 | Kubo |
| 2020/0050072 | A1 | 2/2020 | Kozlowski |
| 2020/0357880 | A1 | 11/2020 | Xu et al. |
| 2021/0124229 | A1 | 4/2021 | Oesterschulze et al. |
| 2022/0308416 | A1 | 9/2022 | Rozbicki |
| 2023/0070931 | A1 | 3/2023 | Bjornard et al. |
| 2023/0093313 | A1 | 3/2023 | Bjornard et al. |

* cited by examiner

100

102

104

500

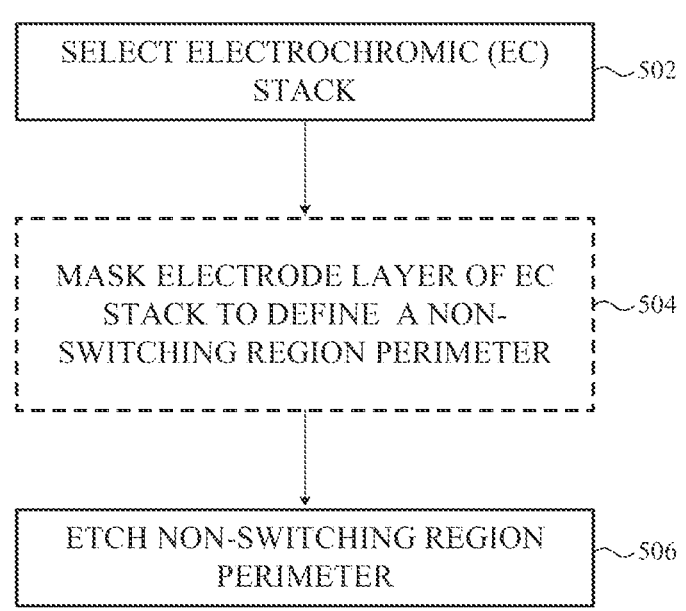

```
┌─────────────────────────────────┐
│  SELECT ELECTROCHROMIC (EC)     │
│            STACK                │─── 502
└─────────────────────────────────┘
                │
                ▼
┌─────────────────────────────────┐
│  MASK ELECTRODE LAYER OF EC     │
│  STACK TO DEFINE  A NON-        │─── 504
│  SWITCHING REGION PERIMETER     │
└─────────────────────────────────┘
                │
                ▼
┌─────────────────────────────────┐
│  ETCH NON-SWITCHING REGION      │
│          PERIMETER              │─── 506
└─────────────────────────────────┘
```

*FIG. 5*

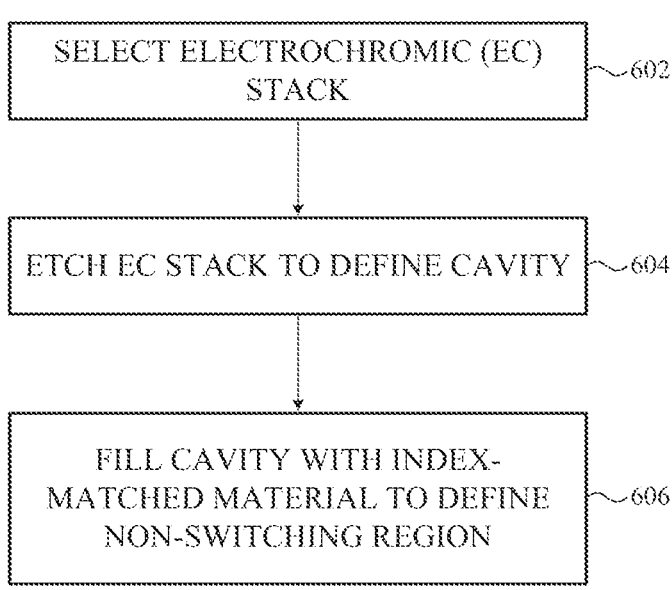
600
SELECT ELECTROCHROMIC (EC) STACK ~602
ETCH EC STACK TO DEFINE CAVITY ~604
FILL CAVITY WITH INDEX-MATCHED MATERIAL TO DEFINE NON-SWITCHING REGION ~606
*FIG. 6*

CONTROLLABLE APERTURE WITH INDEX-MATCHED CENTRAL REGION FOR A PORTABLE ELECTRONIC DEVICE IMAGING SYSTEM

CROSS-REFERENCE TO RELATED APPLICATION(S)

This application is a nonprovisional of, and claims the benefit under 35 U.S.C. § 119 of, U.S. Provisional Patent Application No. 63/246,153, filed on Sep. 20, 2021, and entitled "Controllable Aperture with Index-Matched Central Region for a Portable Electronic Device Imaging System," the contents of which are incorporated by reference in their entirety.

TECHNICAL FIELD

Embodiments described herein relate to imaging systems for portable electronic devices and, in particular, to imaging systems incorporating an electrically-controllable aperture layer positioned above an image sensor of an imaging system of a portable electronic device.

BACKGROUND

An electronic device may include an imaging system for capturing an image of a scene. A conventional imaging system includes an image sensor aligned with a focal plane defined by a configuration of lens elements, referred to as a lens group. The imaging system can also include an aperture positioned between the lens group and the image sensor that limits light exposed to the image sensor.

Certain electronic devices, such as portable electronic devices, are often designed specifically to minimize device profile. As a result, portable electronic devices incorporating imaging systems typically include a fixed aperture, which may not be optimally sized for all scenes.

SUMMARY

Embodiments described herein can take the form of an imaging system for a portable electronic device. The imaging system, also referred to as a camera system, can include a switchable aperture. The switchable aperture includes an optically transparent substrate (e.g., glass), a first transparent conductive layer (e.g., a metal oxide or nanowire dispersion) coupled to the substrate and defining a first region circumscribing a second region, the first region and the second region conductively decoupled from one another. For example, in some cases, the first region can be separated from the second region by an etched cavity, defined through the first transparent conductive layer and defining a perimeter or periphery of the second region.

The switchable aperture also includes a second transparent conductive layer (e.g., the same or a different metal oxide or nanowire dispersion), a transparent optoelectric layer disposed between the first transparent conductive layer and the second transparent conductive layer, a first electrode conductively coupled to the first region of the first transparent conductive layer, a second electrode conductively coupled to the second transparent conductive layer, and a controller conductively coupled to each of the first electrode and the second electrode. As a result of this construction, the controller is configured to apply a voltage across the first electrode and the second electrode which causes the transparent optoelectric layer to change opacity over the first region of the first transparent conductive layer. In these examples, the transparent optoelectric layer remains transparent over the second region of the first transparent conductive layer.

As a result of the foregoing described construction, optical paths through the switchable aperture encounter the same index of refraction regardless whether the controller of the switchable aperture is applying a voltage across the electrodes or not. In a more simple non-limiting phrasing, the first and second regions of the first transparent conductive layer are retained—and not removed during manufacturing—over the transparent optoelectric layer. The conductive decoupling of the first and second regions of the first transparent conductive layer serves to define a switchable region of the transparent optoelectric layer and a non-switchable region of the transparent optoelectric layer, while retaining consistent optical properties through both the switching region and the non-switching region; light that passes through both the switching region and the non-switching region passes through the material of the first transparent conductive layer, the material of the transparent optoelectric layer, and the material of the second transparent conductive layer.

Embodiments described herein can take the form of an imaging system component for a portable electronic device. The imaging system component can include an electrochromic stack defining a non-switching area and a switching area. The non-switching area includes an optically clear dielectric material having a first index of refraction. The switching area, circumscribing the non-switching area, includes a first conductive layer with a first optically transparent conductive material having a second index of refraction, a second conductive layer with a second optically transparent conductive material having a third index of refraction, and a transparent optoelectric layer disposed between the first conductive layer and the second conductive layer and with an electrochromic material having a fourth index of refraction. In this construction, the non-switching area of the electrochromic stack is filled with a material having an index of refraction (the first index of refraction) that substantially matches an average of the second, third, and fourth indexes of refraction.

Further embodiments described herein take the form of an imaging system component for a portable electronic device, the imaging system including an electrochromic stack defining a first conductive layer and a second conductive layer. The second conductive layer defines a first region and a second region, the second region conductively decoupled from the first region and circumscribing the first region. Between the first and second conductive layers can be disposed a transparent optoelectric layer formed from an electrochromic material.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIG. 5 is a flowchart depicting example operations of a method of manufacturing an imaging system component to define a switching region and a non-switching region, such as described herein.

FIG. 6 is a flowchart depicting example operations of a method of manufacturing an imaging system component, such as described herein.

The use of the same or similar reference numerals in different figures indicates similar, related, or identical items.

Figure 1A:
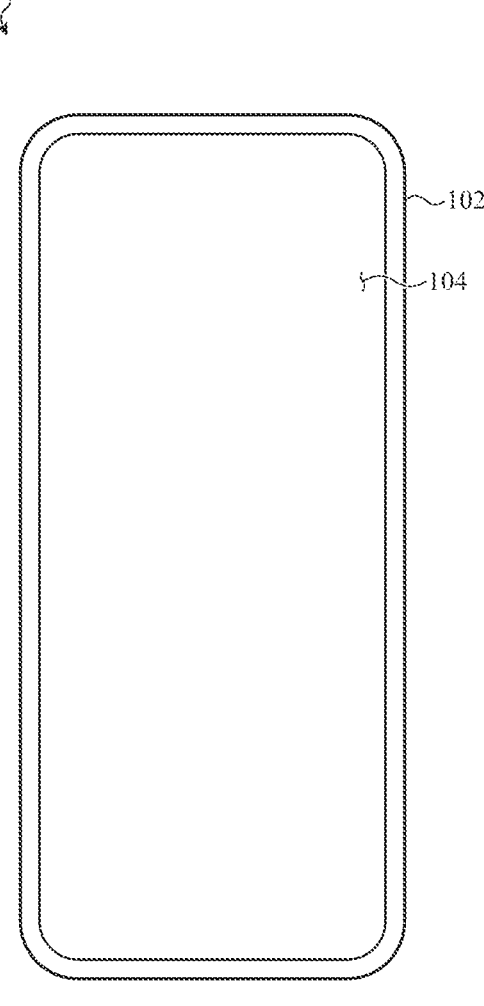
FIG. 1A depicts an example electronic device that can include an imaging system and/or imaging system component, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Similarly, certain accompanying figures include vectors, rays, traces and/or other visual representations of one or more example paths—which may include reflections, refractions, diffractions, and so on, through one or more mediums—that may be taken by, or may be presented to represent, one or more photons, wavelets, or other propagating electromagnetic energy originating from, or generated by, one or more light sources shown or, or in some cases, omitted from, the accompanying figures. It is understood that these simplified visual representations of light or, more generally, electromagnetic energy, regardless of spectrum (e.g., ultraviolet, visible light, infrared, and so on), are provided merely to facilitate an understanding of the various embodiments described herein and, accordingly, may not necessarily be presented or illustrated to scale or with angular precision or accuracy, and, as such, are not intended to indicate any preference or requirement for an illustrated embodiment to receive, emit, reflect, refract, focus, and/or diffract light at any particular illustrated angle, orientation, polarization, color, or direction, to the exclusion of other embodiments described or referenced herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to electronically-controllable apertures (or, more simply, a "switchable aperture") with uniform or substantially uniform index of refraction and optical path length through and between both switching areas and non-switching areas, thereby among other benefits and improvements substantially mitigating phase distortion effects presented by conventional switching apertures.

An electronically-controllable aperture or switchable aperture as described herein may in some implementations be configured for use with a camera module (which may also be referred to herein as an "imaging system") of a portable electronic device, such as a cellular phone, a wearable device, a tablet device, a laptop device, a personal heads up display device, a video conferencing device, and so on.

In particular, a switchable aperture as described herein can be manufactured such that light passing through the switchable aperture encounters substantially the same overall change in index of refraction along its path (a length of which is consistent regardless of incident angle), regardless whether that path intersects a switching region of the switchable aperture or that path intersects a non-switching region of the switchable aperture. As a result of constructions described herein, the switchable aperture exhibits substantially reduced visible light absorption (e.g., a stack exhibits high transparency) compared to conventional designs.

As a result of constructions and manufacturing techniques described herein, a switchable aperture, or other similarly-configured or operated imaging system component, can minimize imaging artifacts, such as (and with particular reference to) phase distortion, that may be imparted by conventional switchable apertures and other conventional switchable or controllable imaging system components.

In particular, many embodiments described herein include an electrochromic stack disposed onto, and/or formed onto, an optically transparent substrate, which may be formed from a material such as a silica glass. The electrochromic stack includes a counter-electrode layer, which can be lithiated to store lithium ions, an ion conductor layer disposed over the counter-electrode to conduct lithium ions from the counter-electrode in the presence of an electric field (e.g., by application of voltage across the electrochromic stack), and an electrochromic material disposed over the ion conductor layer. The electrochromic material can include any suitable organic or inorganic monolith material or combination of materials (e.g., mixture, amalgam, suspension, multilayer, and so on), including transition metal oxides such as tungsten oxide, molybdenum oxide, iridium oxide, nickel oxide, vanadium oxide, and other metal oxides and alloys thereof. In other cases, organic compounds may be used additionally or in place of a transition metal oxide.

For embodiments described herein, as noted above, an electrochromic material can be positioned on, and/or disposed on, an ion conductor layer that facilitates transfer of ions (e.g., lithium ions) to, or from, the electrochromic material, thereby electrochemically inducing an oxidation-reduction in the electrochromic material that in turn changes one or more optical properties of that material, such as transmittance (in a particular band or set of bands of visible or nonvisible light) and/or reflectance (in a particular band or set of bands of visible or nonvisible light).

The electrochromic stack can be disposed between and/or formed between two electrically conductive and optically transparent layers that are conductively decoupled from one another. The optically transparent conductive layers may be formed from a transparent electrically conductive material such as a metal oxide (e.g., indium tin oxide, as one example). In other cases, the optically transparent conductive layers may be formed from a metal nanowire dispersion. Each of the conductive layers can in turn be conductively coupled to at least a respective one electrode, which may be formed from metal. In some cases, an electrode can be at least partially defined as a via through the optically transparent substrate.

As a result of this construction, applying a voltage across the two electrodes generates an electric field between the two optically transparent conductive layers which, in turn, motivates ion transfer to, or from, the electrochromic layer through the ion conductor layer. This change in ion concentration (e.g., charge concentration), as noted above, can result in an oxidation-reduction reaction that affects transmittance (e.g., opacity) and/or reflectance (e.g., color) of the electrochromic stack.

For simplicity of description, the embodiments that follow reference an electrochromic stack configured to change transmittance in the visible spectrum, although it is appreciated that this is merely one example and other electrochromic stacks and other imaging system components can be configured in other ways.

An electrochromic stack, as described herein, can be leveraged in one example as a variable aperture for an imaging system, such as a camera system of a portable electronic device. More particularly, an electrochromic stack having a ring-shaped electrochromic material, with a transparent (e.g., not actively switched) central region, can be positioned between a lens and an image sensor of an imaging system to control an amount of light focused by the lens that reaches the image sensor.

More specifically, the electrochromic stack in such configurations can define a switched area and a non-switched area. The switched area can change from transparent to opaque and opaque to transparent by selective application of voltage, such as described herein. The non-switched area, positioned within a geometric center (although not required; other positionings are possible) of the electrochromic stack, retains transparency so light can always pass therethrough.

In typical embodiments, a non-switched area or region takes a circular shape, and the switched area circumscribes the circular, non-switched area. In this configuration, applying at least a threshold voltage (which may be implementation specific) to the electrodes of the electrochromic stack causes the switched region to transition from substantially or entirely transparent to substantially or entirely opaque or the inverse, selectively. The transition may be binary or may be gradual, or controllable through various transparencies. In some examples, transparency may vary across a radius of the switched area; portions of the switched area nearby the non-switching area may have a higher transparency than areas farther from the non-switching area. As may be appreciated, when the switched region is transparent, the electrochromic stack may transmit light through both the switched region and the non-switched region. Conversely, when the switched region is opaque, the electrochromic stack may transmit light only through the non-switched region.

In this manner, voltage applied to the electrochromic stack controls a size of a light-transmissible area of the electrochromic stack. More broadly, the electrochromic stack defines a multi-stop aperture that can be used with an imaging system; voltage controls an effective radius (or stop) of a transparent portion of the electrochromic stack.

In certain configurations, multiple discrete switching regions can be concentrically defined around the non-switched region. In this manner, sequentially applying voltage to additional switching regions can change the effective radius of the transparent portion of the electrochromic stack through multiple discrete stops. For imaging system implementations, these described constructions offer selectable, analog-domain, control of either or both image brightness and/or depth of field that would otherwise be difficult and/or impossible to reproduce digitally.

An electrochromic stack implemented as a variable aperture for an imaging system can be manufactured in a number of suitable ways. In a first example, the electrochromic stack is disposed layer-by-layer on a base substrate, such as the optically transparent substrate (e.g., silica) referenced above. In particular, a first conductive layer can be disposed and/or formed into the base substrate, for example by physical vapor deposition or tape casting. Thereafter, one or more electrochromic materials can be disposed thereon, which may include an ion conductor layer, a counter-electrode, and/or one or more layers of electrochromic material. A second conductive layer can thereafter be disposed and/or formed onto the electrochromic layer stack.

Once an electrochromic stack is formed, such as described above or by another similar method, a switching region and a non-switching region may be defined using one or more suitable techniques.

In a first embodiment, the electrochromic stack can be etched via laser etching, lift-off, or chemical etching so as to conductively decouple at least two areas of either or both of the first conductive layer or the second conductive layer. In one embodiment, the second conductive layer is etched to define a circular region in approximately a geometric center thereof.

The circular region defines the non-switching region, and the remaining un-etched portion of the second conductive layer of the electrochromic stack that is not etched away and that is not within the circular region, defines a switching region. As a result of this construction, when a voltage is applied between the first and second conductive layers, an electric field is defined substantially only between the first conductive layer and the switching-region of the second conductive layer.

For embodiments such as in the preceding example, the non-switching region still has a portion of the etched conductive in the center of the electrochromic stack. Retaining this material ensures that optical properties of the entire stack remain the same, despite that electrical features or functionality of this region are unused. More specifically, light that passes through the non-switching region still passes through two transparent conductor layers and an electrochromic material, just as light that passes through the switching region (in the bleached state) would. As a result of this construction, light passing through the center of the electrochromic stack has the same path length and experiences the same progressive change(s) in index of refraction.

In further implementations of the preceding embodiment, the etched region of the second conductive layer defines a cavity having a width that conductively decouples the switching region and the non-switching region of the second conductive layer. In some examples, the cavity may be back-filled with a dielectric material and/or a stack or layer of dielectric materials having an effective index of refraction approximately equal to an index of refraction of the second conductive layer. In this manner, light that passes through the electrochromic stack may encounter substantially the same change(s) in index of refraction regardless whether that light is incident to the switching region, the non-switching region, or the etched-away/backfilled region conductively decoupling the switching region from the non-switching region. In a more simple phrasing, the backfill material(s) may prevent phase distortion and other undesirable imaging effects.

In another example, the switching region of the electrochromic stack can be masked to expose the desired shape of a non-switching region, such as a circular shape. Thereafter, the entire electrochromic stack can be etched, for example by an anisotropic etch process. In some cases, the optically transparent substrate can serve as an etch stop. The etch process defines a cavity through the electrochromic stack which may be back-filled with a dielectric material and/or a stack or layering of dielectric materials having an effective/group index of refraction approximately equal to an average or effective index of refraction of the entire cross-section of the switching region of the electrochromic stack. In this manner, light that passes through the electrochromic stack may encounter substantially the same change(s) in index of refraction regardless whether that light is incident to the switching region, the non-switching region, or the etched-away/backfilled region conductively decoupling the switching region from the non-switching region. In a more simple phrasing, as with other described embodiments, the backfill material(s) may prevent phase distortion and other undesirable imaging effects.

These foregoing and other embodiments are discussed below with reference to FIGS. 1A-6. However, those skilled in the art will readily appreciate that the detailed description given herein with respect to these figures is for explanation only and should not be construed as limiting.

FIG. 1A depicts an example electronic device that can include an imaging system and/or imaging system component, such as described herein. The electronic device 100 may be a portable electronic device, such as a cellular phone, wearable device, or tablet computing device. It may be appreciated, however, that a portable electronic device is merely one example device that can include an imaging system and/or imaging system component as described herein.

The electronic device 100 as depicted in FIG. 1A is defined at least in part by a low-profile housing, identified in the figure as the housing 102. The housing 102 can enclose and support one or more components of the electronic device 100, such as a processor, one or more memory components or circuits, a battery, and a display 104. For simplicity of description and illustration, FIG. 1A is depicted without many of these components; a person of skill in the art may readily appreciate that a number of components, circuits, structures, and systems can be included in the housing 102 of the electronic device 100. For example, the electronic device 100 can include a processor configured to access a memory to instantiate a software application configured to render a graphical user interface via the display 104.

Figure 1B:
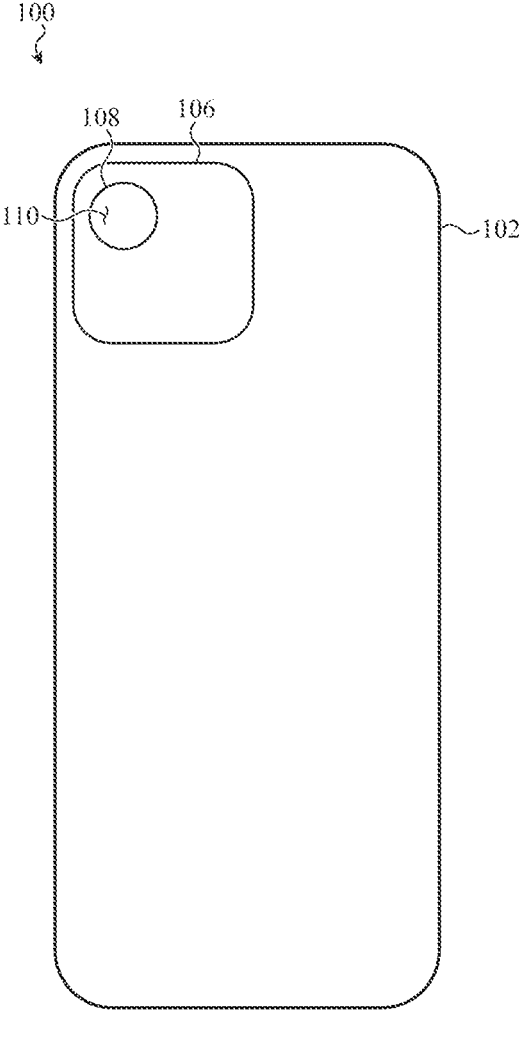
FIG. 1B depicts the example electronic device of FIG. 1A, showing an imaging system, such as described herein.

The software application can, in some examples, be configured to integrate with one or more hardware sensors or sensing systems of the electronic device 100, such as an imaging system. FIG. 1B depicts the example electronic device of FIG. 1A, showing an imaging system 106. The imaging system 106 can include a camera module 108 that includes a set of imaging system components 110.

In particular, the imaging system 106 can include an image sensor disposed at an image plane defined by a lens group of the set of imaging system components 110. The lens group may define a fixed or variable focal length. The set of imaging system components 110 can also include a variable or multi-stop aperture as described herein. The multi-stop aperture can be positioned between the lens group and the image sensor so as to control a quantity of light received by the image sensor. As known to a person of skill in the art, the multi-stop aperture can offer control over image brightness and depth of field.

In many examples, the multi-stop aperture can include an electrochromic stack, as described herein. In particular, the multi-stop aperture may be defined, at least in part, by an electrochromic stack that defines at least one switchable region and, in many examples, a non-switching region. In some cases, a non-switching region may not be required; in such examples, the multi-stop aperture may also function as a shutter, transitioning from fully opaque (or substantially opaque) to at least partially transparent.

The non-switching region of the electrochromic stack of the multi-stop aperture can be positioned generally in a geometric center of the multi-stop aperture. In many examples, the non-switching region takes a circular shape, although this is not required of all embodiments and other shapes may be possible or preferred. In typical examples, the non-switching region is aligned with an imaging axis of the lens group and the image sensor.

The non-switching region of the electrochromic stack of the multi-stop aperture is circumscribed by a switching region. As noted with respect to other embodiments described herein, the switching region can toggle between transparent and opaque in response to an application of appropriate, implementation-specific, voltage (e.g., at least a threshold voltage of a particular polarity). In some cases, application of voltage induces a transition from transparent to opaque. In other cases, application voltage induces a transition from opaque to transparent.

In this manner, when the switching region circumscribing the non-switching region is opaque, the effective diameter of the multi-stop aperture is defined by a diameter of the non-switching region. Alternatively, when the switching region is transparent, the effective diameter is larger and is defined by the a diameter or area of the switching region.

In some embodiments, as noted above, the switching region can be segmented into concentrically-aligned switchable regions so that multiple discrete aperture diameters can be selectively activated. For simplicity of description, the embodiments described herein focus to implementations with a single switching region; it is appreciated that this is merely one example and other embodiments may be implemented differently.

The switching region of the electrochromic stack of the multi-stop aperture is conductively coupled to a controller, which may be referred to as an aperture controller. The aperture controller can include a switchable voltage source that can be selectively applied to the switching region to change the transmissivity thereof.

In many cases, the aperture controller is communicably coupled to one or more instances of software executing over a processor disposed within the housing 102 of the electronic device 100. For example, in some embodiments, a software application instance instantiated over a processor and/or memory of the electronic device 100 can leverage the display 104 to generate a user interface with which a user of the electronic device 100 can interact. In some examples, the software application may be an imaging application, such as a camera control application.

The camera control application can present one or more user interface elements via the display 104 which may be selected by a user. In some cases, one of the user interface elements can be used by a user of the electronic device 100 to control a size of the aperture. In other words, in some cases, the user interface may receive a signal or other input from a user comprising an instruction to change a size of the aperture of the camera module 108. In response to the signal received via the user interface, the aperture controller can apply a voltage to at least one switching region of the electrochromic stack to change a transmissivity of that region, thereby changing an effective diameter of the multi-stop aperture of the imaging system 106.

These foregoing embodiments depicted in FIGS. 1A-1B and the various alternatives thereof and variations thereto are presented, generally, for purposes of explanation, and to facilitate an understanding of various configurations and constructions of a portable electronic device that can incorporate an imaging system that includes a variable aperture, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
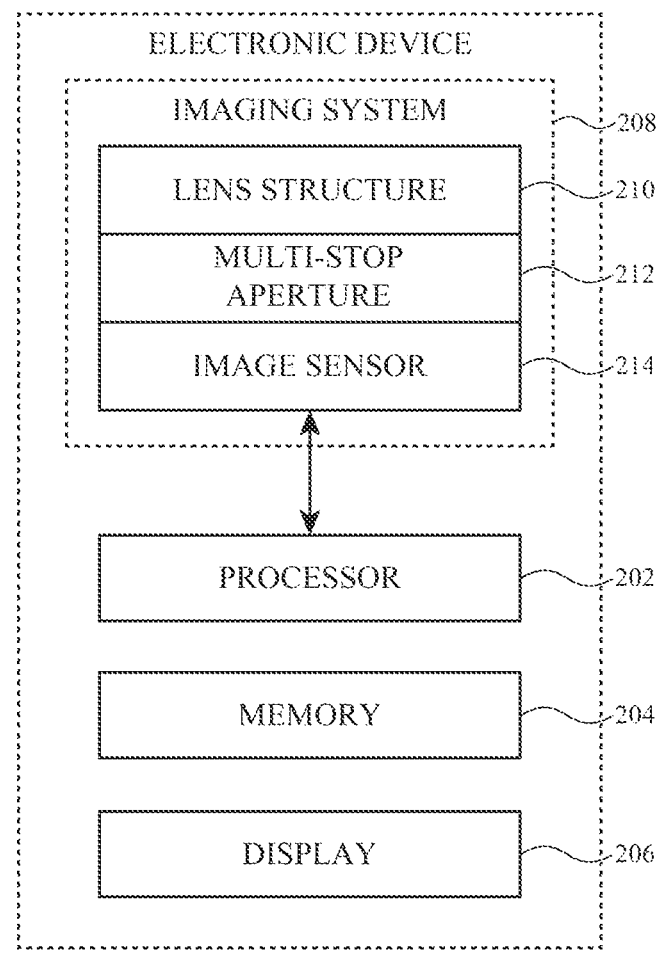
FIG. 2 is a simplified system diagram of an electronic device as described herein.

For example, more generally and broadly, it may be appreciated that any suitable electronic device can include an imaging system as described herein. FIG. 2 is a simplified system diagram of such an example electronic device that can include an imaging system, as described herein.

For example, an electronic device that can include an imaging system and/or imaging system component as described herein can be implemented as an example electronic device, identified in FIG. 2 as the electronic device 200.

The electronic device 200 can include a processor 202, a memory 204, and (optionally) a display 206. As noted with respect to other embodiments described herein, the processor 202 can be configured to access the memory 204 to retrieve one or more computer-executable instructions and/or other executable assets in order to instantiate one or more instances of software that, in turn, may perform or coordinate one or more operations performed by the processor 202.

For example, in some embodiments, the electronic device 200 can leverage the processor 202 and the memory 204 to instantiate an instance of a photography software application. The photography software application instance can be configured to access and/or communicably couple to an imaging system 208 of the electronic device 200.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

Similarly, the term "memory" refers to any software and/or hardware-implemented data processing device or circuit physically and/or structurally configured to define a temporary or durable (e.g., volatile or nonvolatile) storage media configured to store one or more data structures or files and so on, regardless of media type (e.g., optical, magnetic, electric, photonic, and so on).

The imaging system 208 can include a lens structure 210, a multi-stop aperture 212, and an image sensor 214. The lens structure 210 can be configured to receive and focus light from a scene external to the electronic device 200 that may be imaged by the image sensor 214. The lens structure 210 can include any suitable number of optical elements configured to modify a phase or direction of light passing through. The lens structure 210 can include one or more movable or fixed concave or convex lenses; the configuration and/or position of the lenses of the lens structure 210 can vary from embodiment to embodiment.

In some cases, the lens structure 210 can also include one or more filters configured to exhibit selected reflectance and/or transmittance for particular bands of light. For example, the lens structure 210 can include an infrared cut filter configured to reflect infrared light away from the image sensor 214. In other cases, an infrared cut filter may be configured to absorb infrared light. In yet other cases, the lens structure 210 can include one or more color filters configured to reflect particular colors of light. In yet other cases, the lens structure 210 can include one or more reflective surfaces, such as mirrors or beam splitters configured to redirect a path of light as it passes through the lens structure 210. For example, in some constructions the imaging system 208 can be implemented with a periscopic lens structure.

These forgoing examples are not exhaustive of the types or arrangements of optical elements that can be leveraged by an imaging system, such as described herein. In particular, it may be appreciated by a person of skill in the art that the lens structure 210 can include any number of suitable optical elements, arranged in any suitable order, for any particular embodiment.

The imaging system 208 also includes a multi-stop aperture 212 positioned between the lens structure 210 and the image sensor 214. The multi-stop aperture 212 is configured to selectably control a quantity of light exposed to the image sensor 214. More specifically, the multi-stop aperture 212 defines a switchable opaque area circumscribing a non-switchable transparent area. The transparent area is defined in a center of the multi-stop aperture 212 and exhibits substantially the same index of refraction as the switchable opaque area that circumscribes the transparent area.

For example, in some constructions the transparent area of the multi-stop aperture 212 is formed from a non-active/deactivated portion of an electrochromic stack. An active portion of the same electrochromic stack can circumscribe the non-active portion. In this construction the entire multi-stop aperture is formed from the same layers of material, and thus exhibits substantially the same index of refraction across its area, regardless whether light passes through the non-active portion of the electrochromic stack (e.g., a non-switched, transparent, central region) or whether light passes through the active portion of the electrochromic stack.

An electrochromic stack including an active portion circumscribing a non-active portion can be manufactured in a number of suitable ways. In some embodiments, a sheet of electrochromic material (e.g., a sheet defining a single, active area) includes two transparent conductive sheets disposed on opposite surfaces of an ion conductor layer and an electrochromic material. In these examples, one or both of the conductive sheets can be etched via laser or chemical processes to conductively decouple one portion of the sheet from another. For example, a laser may be used to define a non-switching region from a switching region by tracing out a circular pattern following a perimeter of a desired shape of the non-switching region. In another example, an etch process may be used to conductively decouple the switching region from the non-switching region.

In these examples, a channel that separates the switching region from the non-switching region can introduce phase distortion or other undesirable effects. More specifically, light that passes through the channel encounters a different index of refraction than light that passes through the switching region or the non-switching region. More specifically, light that passes through either the switching region or the non-switching region first encounters a transparent conductive sheet whereas light that passes through the channel first encounters either an electrochromic material or an ion conductor layer. As a result of this difference, phase of light that reaches the image sensor 214 may be different depending on whether that light passed through the channel of the multi-stop aperture 212 or a switching or non-switching region of the multi-stop aperture 212.

To account for, and mitigate, phase distortion and other undesirable optical effects, the channel can be backfilled as described above with a dielectric material that approximates, and/or is equal to, an index of refraction of the transparent conductive layer through which the channel is defined. For example, in some embodiments, the transparent conductive layer may be formed from indium-tin oxide, which may have an index of refraction of 1.9-2.0. In this example, the channel may be backfilled with niobium oxide, zirconium oxide, silicon nitride, or mixtures thereof to define a dielectric backfill material having an index of refraction approximately equivalent to 1.9-2.0. In other examples, a material having an index of refraction as close to 1.9-2.0 as possible may be selected; custom dielectric materials may be suitably designed and used to approximate an index of refraction of the conductive layer. In some cases, the dielectric may be a solid material, such as a cured adhesive or polymer material. In other cases, a liquid dielectric may be used. In still other cases, the channel may be backfilled with a gas having an index of refraction equal to and/or approximating an index of refraction of the conductive layer. In these examples, the multi-stop aperture 212 may be hermetically sealed to prevent gaseous or liquid backfill materials from escaping.

As a result of the foregoing described implementation, light that passes through the multi-stop aperture 212 may encounter substantially the same index of refraction, regardless of whether that light passes through the non-switching region, the switching region, or the channel region separating the switching region from the non-switching region.

In other configurations, a non-switching region of the multi-stop aperture 212 can be formed by etching through an entire electrochromic stack (e.g., not just the outermost transparent conductive layers). In these examples, a cavity taking the shape of a non-switching layer can be defined by etching through the entire stack. As with other embodiments described herein, the cavity can be filled with a material that approximates the index(es) of refraction of light passing through other portions of the multi-stop aperture 212.

For example, in some embodiments, the backfill material can be selected to approximate an average index of refraction of each transparent conductive layer, the ion conducting layer, and the electrochromic layer. For example, if the transparent conductive layers have an index of refraction of 2.0, the ion conducting layer has an index of refraction of 1.5-2.2, and the electrochromic layer has an index of refraction of 2.1, an average of the four layers is a refractive index of 1.86-2.1. In this example, a backfill material a proportional mixture of $Al_2O_3$ and $ZrO_2$ to achieve a desired index in the range of 1.86-2.1 backfill material may be selected.

In addition, the backfill material may be disposed and/or finished or polished to be flush with upper surface defining the volume(s) or cavities filled by the backfill material. This may be particularly useful to ensure that optical path length through the stack is consistent regardless of incident angle and regardless whether an optical path intersects a switching region, a non-switching region, a backfilled region, or any other region of the stack. In a more simple phrasing, the backfill material may be formed from a material or set of materials approximating changes in index of refraction imparted by the stack, but also may be formed to a thickness that ensures optical path length matches the stack.

In some cases, more than one backfill material may be used. In such examples, a multilayer backfill material can be architected such that each successive layer is disposed to a thickness and exhibits an index of refraction approximating another layer within the same plane. For example, a first layer of backfill may be disposed to the thickness of a first transparent conductive layer and may have an index of refraction approximating the index of refraction of the first transparent conductive layer. A second layer of backfill material may be disposed over the first backfill layer and may be disposed to a thickness of an electrochromic layer disposed over the first transparent conductive layer. The second backfill layer may have an index of refraction substantially approximating an index of refraction of the electrochromic layer.

These foregoing examples are not exhaustive; it may be appreciated that any number of suitable optically transparent materials and/or backfill layers may be used in other embodiments.

These foregoing embodiments depicted in FIGS. 1A-2 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 3A:
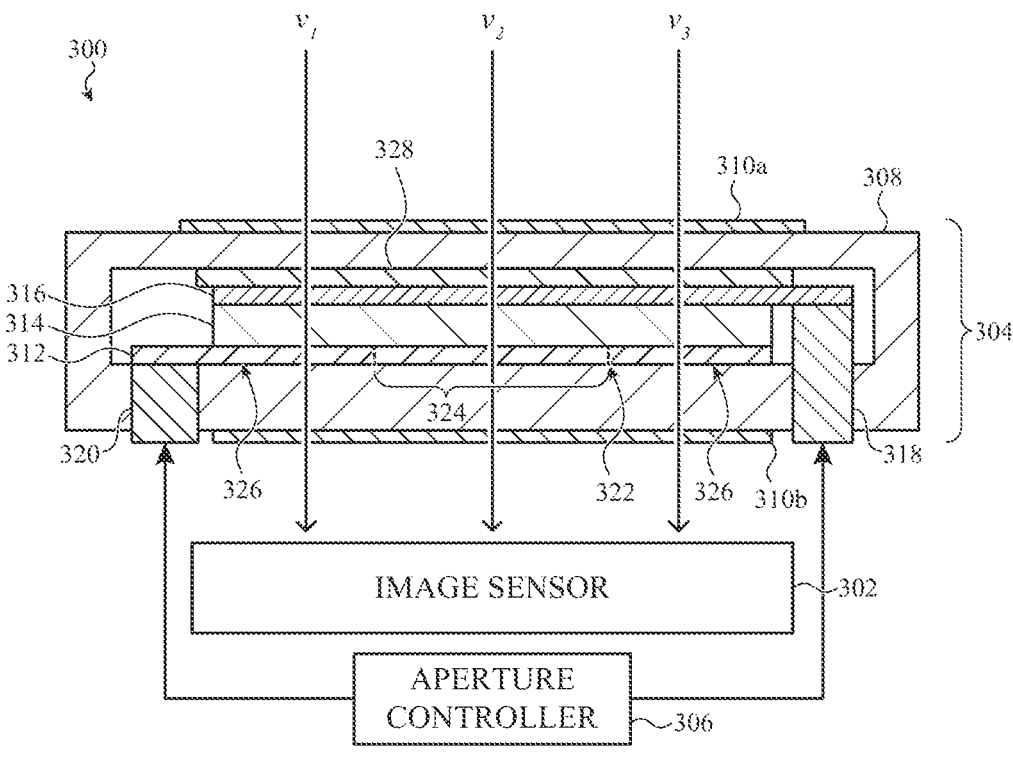
FIG. 3A depicts an imaging system component in cross-section that may be used with an imaging system incorporated into an electronic device, such as described herein.

FIG. 3A depicts an imaging system component 300 in cross-section that may be used with an imaging system incorporated into an electronic device, such as described herein.

The imaging system component 300 can be incorporated into any suitable imaging system for use with any suitable electronic device as described herein (e.g., see FIGS. 1A-2). In many embodiments, the imaging system component 300 is incorporated into a low-profile camera module of a portable electronic device, such as a cellular phone although it may be appreciated that this is merely one example.

The imaging system component 300, as with other embodiments described herein, can be configured to operate as a variable stop aperture.

In this example embodiment, the imaging system component 300 is configured to be positioned relative to an image sensor 302 so that the imaging system component 300 can effectively control a quantity of light exposed to the image sensor 302. More specifically, an electrochromic stack 304 can be aligned parallel to an imaging surface of the image sensor 302. A geometric center of the electrochromic stack 304 may be aligned with a geometric center of the imaging surface of the image sensor 302. Relative positioning between the electrochromic stack 304 and the image sensor 302 may vary from embodiment to embodiment.

The electrochromic stack 304 can be electrically and conductively coupled to an aperture controller 306 configured to apply at least a threshold voltage to the electrochromic stack 304 to change opacity (transmittance) of a switching region of the electrochromic stack 304 to change an effective transparent radius of the electrochromic stack 304, thereby changing a quantity of light exposed to the image sensor 302.

The electrochromic stack 304 includes a substrate 308 that may be formed from glass. In some cases, the substrate 308 defines a volume in which other functional and structural layers of the electrochromic stack 304 can be disposed. In some cases, the substrate 308 is formed from silica, although this is merely one example. In the illustrated example embodiment, the substrate is defined by an upper sheet and a lower sheet coupled by sidewalls to define an interior volume. It may be appreciated that this is merely one example construction and that other embodiments may be implemented in different ways.

The substrate 308 of the electrochromic stack 304 can have disposed on one or more external surfaces thereof an antireflective coating, such as an antireflective coating 310a or an antireflective coating 310b. In some cases, the antireflective coating 310a may be disposed onto a surface of the substrate 308 by sputtering or another physical vapor deposition process. In other cases, the antireflective coating 310a may be adhered to the substrate 308 with an adhesive. In yet other examples, the antireflective coating 310a may be disposed into the substrate 308 as a liquid which is thereafter cured. In further examples, more antireflective coatings or layers can be added or positioned elsewhere in order to minimize reflections within the stack. It may be appreciated that these examples are not exhaustive; a person of skill in the art may readily appreciated that many suitable methods of disposing an antireflective coating may be used.

The antireflective coating 310a and the antireflective coating 310b may be configured to reflect and/or pass the same or different bands of light. For example, in some cases, the antireflective coating 310a is an infrared cut filter, whereas the antireflective coating 310b is a polarizing filter. In other cases, the antireflective coating 310a and the antireflective coating 310b are formed from the same material and serve the same purpose. In yet other embodiments, either or both the antireflective coating 310a and the antireflective coating 310b may be omitted entirely.

A first transparent conductor 312 may be disposed on a surface of the substrate opposite the antireflective coating 310b. The first transparent conductor 312 can be formed from any number of suitable conductive transparent materials such as and including indium tin oxide or other conductive metal oxides. The first transparent conductor 312 can be disposed onto a surface of the substrate 308 via any suitable method including physical vapor deposition.

An electrochromic layer 314 can be disposed over the first transparent conductor 312. The electrochromic layer 314 can be implemented in a number of ways. In some embodiments, the electrochromic layer 314 is formed from a lithiated oxide such as a lithiated tungsten oxide or a lithiated niobium oxide. In some cases, the electrochromic layer 314 can include multiple electrochromic materials, such as a layer formed from tungsten oxide and a layer formed from nickel oxide. In other cases, the electrochromic layer 314 includes an electrolyte conductive layer and an inorganic or organic electrochromic layer disposed over the electrolyte layer. These examples are not exhaustive; it may be appreciated by a person of skill in the art that a number of suitable materials and layer constructions of the electrochromic layer 314 can be used.

A second transparent conductor 316 may be formed over the electrochromic layer 314. The second transparent conductor 316 can be formed from the same material as the first transparent conductor 312, although this is not required of all embodiments.

The second transparent conductor 316 and the first transparent conductor 312 are disposed in a conductively decoupled manner such that when a voltage is applied across the conductors, a corresponding electric field can induce an electrochromic effect in the electrochromic layer 314. In particular, the first transparent conductor 312 can be conductively coupled to a first electrode 320 (which may be defined in part through the substrate 308) and the second transparent conductor 316 can be conductively coupled to a second electrode 318 (which, like the first electrode 320, may be defined in part through the substrate 308, e.g., as a through-glass via). As a result of this construction, the aperture controller 306 can be conductively coupled to the first and second electrodes in order to control electrochromic state(s) of the electrochromic layer 314.

In this example embodiment, the first transparent conductor 312 may be laser etched (or etched in another manner) to conductively decouple at least two portions of the first transparent conductor 312. By decoupling these portions, the first transparent conductor 312 defines a first region and a second region or, more specifically, a switched region and a non-switched region. As a result of this construction, an application of voltage to the first transparent conductor 312 may only generate an electric field in the switched region, thereby only inducing an electrochromic effect in the switched region.

In particular, a channel 322—which may be backfilled as described above—can be etched into the first transparent conductor 312 to define a non-switching region 324 of the electrochromic layer 314 and, more generally, the electrochromic stack 304.

More specifically, as a result of the channel 322, the first transparent conductor 312 is electrically separated into a first region conductively coupled to the second electrode 318 (and the aperture controller 306) and a second region that is conductively decoupled from the second electrode 318 (and the aperture controller 306).

As a result, when the aperture controller 306 applies a voltage between the first electrode 320 and the second electrode 318, an electric field is generated only in the overlapping area between the first region of the first transparent conductor 312 and the second transparent conductor 316. In turn, because the electric field is generated only between the first region of the first transparent conductor 312 and the second transparent conductor 316, an electrochromic effect is only induced in the electrochromic layer 314 in that same area. In other words, when the aperture controller 306 applies a voltage to the first electrode 320 and the second electrode 318, only a portion of the electrochromic layer 314 changes from transparent to opaque.

As a result of this architecture, the electrochromic layer 314 defines two separate and distinct regions—a non-switching region 324 having a shape defined by the channel 322 (e.g., in many cases, a circular shape) and a switching region 326. The switching region 326 circumscribes the non-switching region 324.

Figure 3B:
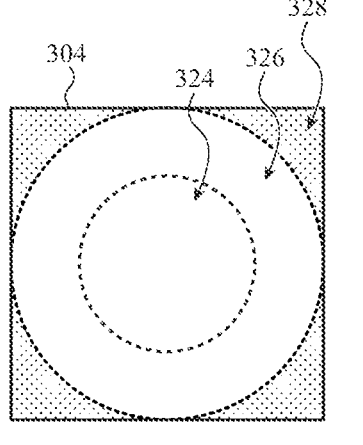
FIG. 3B depicts the imaging system component of FIG. 3A depicting a switching region and a non-switching region operated in a first mode, such as described herein.
Figure 3C:
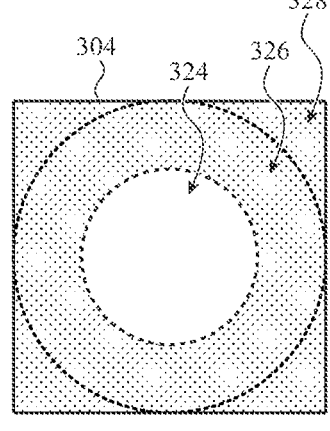
FIG. 3C depicts the imaging system component of FIG. 3B operated in a second mode.

In this manner, if the aperture controller 306 applies a first voltage (e.g., which may be zero volts, positive voltage to a threshold, negative voltage to a threshold, and so on) to the electrochromic stack 304, the switching region 326 may be transparent, such as shown in FIG. 3B. Alternatively, if the aperture controller 306 applies a second voltage different from the first voltage to the electrochromic stack 304, the switching region 326 can transition to opaque, such as shown in FIG. 3C. In some cases, a permanently opaque region can be defined to circumscribe the switching region 326. The opaque region can be formed from ink, or may be formed as a second non-switching region, such as the non-switching region 328. In many cases, the non-switching region 328 can be concentrically aligned with the switching region 326 and the non-switching region 324, although this may not be required of all embodiments. Further, although shown as concentric circles, this shape may not be required of all embodiments; other shapes are possible. In still further examples, the switching region 326 may not be a binary switch and/or may not transition to entirely transparent or entirely opaque. For example, in some embodiments, the switching region may transition from 90% transparency to 5% transparency in a binary fashion or in a graduated fashion; in some cases, any suitable transparency between 100% to 0% may be selected; in some cases, transparency can be changed during an image capture operation to create one or more visual effects.

These foregoing embodiments depicted in FIGS. 3A-3C and the various alternatives thereof and variations thereto are presented, generally, for purposes of explanation, and to facilitate an understanding of various configurations and constructions of an imaging system component, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, as noted above, in some examples, the channel 322 may be backfilled with a dielectric material having an index of refraction substantially equal to an index of refraction of the first transparent conductor 312. As a result of this construction, light passing through the electrochromic stack 304 may encounter the same change in index of refraction, regardless the path the light takes through the electrochromic stack 304 (see, e.g., vectors $v_1$, $v_2$, $v_3$).

Similarly, the backfill into the channel 322 may be disposed to (and/or machined, polished, or post processed to) precisely the same depth or thickness as the first transparent conductor 312. This construction ensures consistent path length through the electrochromic stack 304 in addition to consistent change in index of refraction, regardless the path light takes through the electrochromic stack 304.

Further, in some embodiments, more than one switching region can be defined. For example, multiple concentric rings of switching areas may be defined and may be individually addressable to the aperture controller 306. In these examples, the aperture controller 306 can selectively apply appropriate voltage to each additional ring so as to effectively change a radius (or other dimension or shape) of a transparent portion or an opaque portion of the electrochromic stack 304.

In some examples, binary switching from fully transparent to fully opaque may not be required; in some cases partial transparency may be achieved by applying a different voltage to the electrochromic stack 304 (e.g., a gaussian aperture).

Further, in some cases, one or more of the layers of the electrochromic stack may not necessarily be formed onto the substrate 308 directly. In some cases, the electrochromic stack 304 can be adhered to a portion of the substrate 308, for example by an optically clear adhesive 328. In some embodiments, the optically clear adhesive 328 may have substantially the same index of refraction as antireflective layers and the base substrate, although this may not be required of all embodiments.

In some examples, the channel may be wider and/or may have another shape than shown in FIG. 3A. For example, the channel may have any suitable width or depth. In some examples, the channel may extend, at least partially, into either the substrate 308 and/or the second transparent conductor 316.

Figure 4:
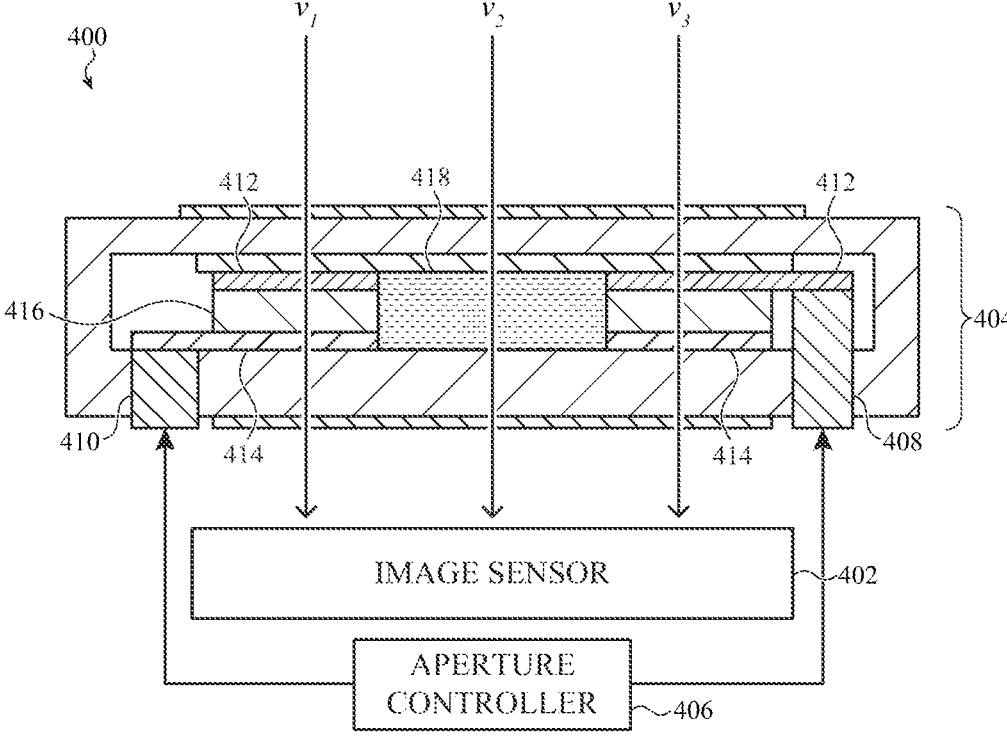
FIG. 4 depicts an imaging system component in cross-section that may be used with an imaging system incorporated into an electronic device as described herein.

In other embodiments, the non-switchable region may be defined in a different manner. For example, FIG. 4 depicts an imaging system component similar to the imaging system component depicted in FIG. 3A. The imaging system component 400 is depicted in cross-section and may be used with an imaging system incorporated into an electronic device as described herein.

As with other embodiments described herein, the imaging system component 400 can be positioned relative to an image sensor 402. The imaging system component 400 includes an electrochromic stack 404 that is conductively coupled to an aperture controller 406. The aperture controller 406 is in turn conductively coupled to at least two electrodes extending from the electrochromic stack 404. Two electrodes are shown in FIG. 4, and are identified as the first electrode 408 and the second electrode 410.

The first electrode 408 is conductively coupled to a first transparent conductor 412 and the second electrode 410 is conductively coupled to a second transparent conductor 414. Between the two transparent conductors may be disposed an electrochromic layer 416 which may include one or more transparent lithiated transition metal oxides. The first transparent conductor 412 can extend across an entirety of the stack, although this is not required of all embodiments and a central region thereof may be removed. In other cases, other transparent conductor layers of the stack may extend across the entirety of the stack, including across backfill layers. In such examples, additional light absorption may occur although absorption may be consistent across the entire stack. Correspondingly, in many embodiments, central regions of shared conductors, such as the first transparent conductor 412, may be not disposed (and/or removed).

In this embodiment, the electrochromic stack 404 may be etched through in an anisotropic manner to define a central void. In some embodiments, a substrate supporting the electrochromic stack 404 (e.g., the substrate 308 of FIG. 3A) may serve as an etch stop.

The central void may be backfilled with a dielectric material 418. The dielectric material 418 may be monolithic or multilayer. As with other embodiments described herein, the dielectric material 418 may be selected such that an index of refraction of the dielectric material 418 approximates and/or is equal to an average index of refraction of the first transparent conductor 412, the electrochromic layer 416, and the second transparent conductor 414. In this manner, light passing through the electrochromic stack 404 encounters a substantially identical change in index of refraction, regardless whether that light passes through the dielectric material 418 (e.g., a non-switching region) or through the first transparent conductor 412, the electrochromic layer 416, and the second transparent conductor 414 (see, e.g., vectors $v_1$, $v_2$, $v_3$).

As with other embodiments described herein, the backfill into the void may be disposed to (and/or machined, polished, or post-processed to) precisely the same depth or thickness as the total thickness of the first transparent conductor 412, the electrochromic layer 416, and the second transparent conductor 414. As noted above, this construction ensures consistent path length through the electrochromic stack 404 in addition to consistent change in index of refraction, regardless the path light takes through the electrochromic stack 404.

These foregoing embodiments depicted in FIG. 4 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

FIG. 5 is a flowchart depicting example operations of a method of manufacturing an imaging system component to define a switching region and a non-switching region, such as described herein. The method 500 includes operation 502 at which an electrochromic stack is selected. The electrochromic stack can include at least a first transparent conductor, an electrochromic material, and a second transparent conductor. Next, at operation 504, a portion of the electrochromic stack may be masked (optionally) to define a perimeter of a non-switching region of the electrochromic stack. Finally, at operation 506, the perimeter of the non-switching region may be etched by leveraging a suitable process, such as chemical etching (e.g., wet or dry, isotropic or anisotropic), laser etching, or mechanical etching. A person of skill in the art may readily appreciate that different embodiments may leverage different etching techniques.

In some embodiments, a transparent conductor of an electrochromic stack may be etched before subsequent layers of the electrochromic stack are disposed or formed on the etched transparent conductor.

FIG. 6 is a flowchart depicting example operations of a method of manufacturing an imaging system component, such as described herein. As with other embodiments described herein, the method 600 includes operation 602 at which an electrochromic stack is selected. The electrochromic stack can include at least a first transparent conductor, an electrochromic material, and a second transparent conductor. The method 600 also includes operation 604 at which a cavity may be etched through each of the layers of the electrochromic stack to define a cavity. In some cases, a masking step (e.g., via photolithography) may occur prior to etching.

Finally, at operation 606, the cavity defined at operation 604 can be backfilled with a material that has an index of refraction (e.g., index-matched) substantially equal to an average index of refraction of the electrochromic stack.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. An imaging system for a portable electronic device, the imaging system comprising:

a switchable aperture comprising:

an optically transparent substrate;

a first transparent conductive layer coupled to the optically transparent substrate and defining a first region within the first transparent conductive layer circumscribing a second region within the first transparent conductive layer, the first region and the second region conductively decoupled from one another by a channel, the first region and the second region formed from a common electrically conductive and optically transparent material;

a second transparent conductive layer;

a transparent optoelectric layer disposed between the first transparent conductive layer and the second transparent conductive layer;

a first electrode conductively coupled to the first region of the first transparent conductive layer; and a second electrode conductively coupled to the second transparent conductive layer; and a controller conductively coupled to each of the first electrode and the second electrode and configured to apply a voltage across the first electrode and the second electrode to cause the transparent optoelectric layer to change opacity over the first region of the first transparent conductive layer.

2. The imaging system of claim 1, wherein:

the optically transparent substrate is a first optically transparent substrate; and the switchable aperture comprises a second optically transparent substrate aligned with the first optically transparent substrate and coupled to the second transparent conductive layer.

3. The imaging system of claim 2, wherein:

the first optically transparent substrate defines a first surface and a second surface, the second surface coupled to the first transparent conductive layer and opposite the first surface; and the second optically transparent substrate defines a third surface and a fourth surface, the third surface opposite the fourth surface and oriented to face the second surface.

4. The imaging system of claim 3, the switchable aperture comprising an antireflective coating disposed on the first surface.

5. The imaging system of claim 4, wherein:

the antireflective coating is a first antireflective coating; and the switchable aperture comprises a second antireflective coating disposed on the fourth surface.

6. The imaging system of claim 3, wherein:

the first transparent conductive layer is coupled to the second surface by an optically clear adhesive; and the switchable aperture comprising at least one antireflective coating selected to minimize reflection within the switchable aperture.

7. The imaging system of claim 3, wherein:

the first transparent conductive layer is formed onto the second surface;

the transparent optoelectric layer is formed onto the first transparent conductive layer; and the second transparent conductive layer is formed onto the transparent optoelectric layer.

8. The imaging system of claim 1, comprising an imaging sensor positioned below the switchable aperture and aligned with the second region of the first transparent conductive layer.

9. The imaging system of claim 1, wherein the transparent optoelectric layer is coupled to each of the first transparent conductive layer and the second transparent conductive layer.

10. The imaging system of claim 1, wherein the transparent optoelectric layer comprises an electrochromic material.

11. The imaging system of claim 1, wherein the first transparent conductive layer comprises a metal oxide material.

12. The imaging system of claim 1, wherein the second region has a circular shape.

13. An imaging system component for a portable electronic device, the imaging system component comprising:

an electrochromic stack defining:

a non-switching area comprising an optically clear dielectric material having a first index of refraction; and a switching area circumscribing the non-switching area and comprising:

a first conductive layer comprising a first optically transparent conductive material having a second index of refraction;

a second conductive layer comprising a second optically transparent conductive material having a third index of refraction; and a transparent optoelectric layer disposed between the first conductive layer and the second conductive layer and comprising an electrochromic material having a fourth index of refraction, the first index of refraction substantially matching an average of the second, third, and fourth indexes of refraction.

14. The imaging system component of claim 13, wherein:

the switching area is a first switching area; and the electrochromic stack comprises a second switching area circumscribing the first switching area.

15. The imaging system component of claim 13, wherein the non-switching area has a circular shape.

16. The imaging system component of claim 13, comprising:

an optically transparent substrate; wherein:

the electrochromic stack is coupled to the optically transparent substrate.

17. The imaging system component of claim 16, wherein the optically clear dielectric material is a multilayer stack of optically clear dielectric materials.

18. An imaging system component for a portable electronic device, the imaging system component comprising:

an electrochromic stack defining:

a first conductive layer;

a second conductive layer, the second conductive layer defining a first region and a second region conductively decoupled from the first region by a channel, the first region circumscribed by the second region and each of the first region and the second region comprising a common optically transparent and electrically conductive material; and a transparent optoelectric layer disposed between the first conductive layer and the second conductive layer and comprising an electrochromic material.

19. The imaging system component of claim 18, wherein one of the first conductive layer or the second conductive layer is formed on a transparent substrate.

20. The imaging system component of claim 19, wherein the electrochromic stack has a transparency of 90% or greater when the electrochromic material is in a bleached state.

* * * * *